United States Patent [19]

Plostnieks

[11] 3,723,458

[45] Mar. 27, 1973

[54] (1-ALKOXYVINYL)2-OXO-3-INDOLINE ACETATES

[75] Inventor: Janis Plostnieks, Phila, Pa.

[73] Assignee: McNeil Laboratories, Inc.

[22] Filed: Dec. 21, 1970

[21] Appl. No.: 100,525

Related U.S. Application Data

[60] Division of Ser. No. 799,948, Feb. 17, 1969, Pat. No. 3,577,430, which is a continuation-in-part of Ser. No. 642,685, June 1, 1967, abandoned, which is a continuation-in-part of Ser. No. 553,034, May 26, 1966, abandoned.

[52] U.S. Cl. .................................................260/325
[51] Int. Cl. ..............................................C07d 27/40
[58] Field of Search.......................................260/325

[56] References Cited

UNITED STATES PATENTS 3,577,430   5/1971   Plostnieks ...........................260/325

*Primary Examiner*—Donald G. Daus
*Assistant Examiner*—Joseph A. Narcavage
*Attorney*—Robert L. Minier et al.

[57] ABSTRACT

The compounds are of the class of 2-oxindole acetamides useful as ultra-violet light absorbers and having central nervous system depressant activity; and of the class of 2-oxo-3-indoline acetate esters useful as intermediates in the preparation of said acetamides.

2 Claims, No Drawings

(1-ALKOXYVINYL)2-OXO-3-INDOLINE ACETATES

This is a divisional application of my co-pending application Ser. No. 799,948, filed Feb. 17, 1969, now U.S. Pat. No. 3,577,430 which in turn is a continuation-in-part of application Ser. No. 642,685, filed June 1, 1967, now abandoned, which in turn is a continuation-in-part of application Ser. No. 553,034, filed May 26, 1966, now abandoned.

This invention relates to novel chemical compounds and, more particularly, to novel 2-oxindole acetamides and to new intermediate compounds involved in the preparation thereof. The oxindole acetamides of this invention may be represented by the following structural formulas:

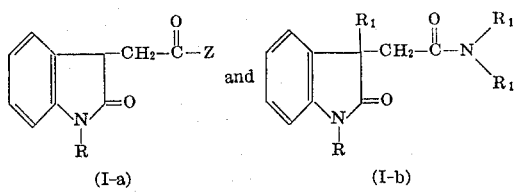

(I-a) and (I-b)

wherein R is a member selected from the group consisting of hydrogen, lower alkyl and aralkyl, preferably benzyl: $R_1$ is lower alkyl; and Z is a member selected from the group consisting of $NH_2$, $NHR_2$,

and N — B, provided that, when Z is $NH_2$, said R is other than hydrogen.

The symbol $R_2$ in the aforementioned $NHR_2$ represents hydroxy; lower alkyl; hydroxy-lower alkyl, e.g. β-hydroxyethyl, γ-hydroxypropyl and the like; dialkylamino-lower alkyl, e.g., β-dimethylamino-ethyl, γ-diethylamino-propyl and the like; lower alkoxy-carbonyl-lower alkyl, e.g., ethoxycarbonylmethyl, β-ethoxycarbonyl-ethyl and the like; dialkylamino-carbonyl-lower alkyl, e.g., dimethylamino-carbonyl-methyl, diethylaminocarbonyl-methyl and the like; aralkyl, e.g., phenyl-lower alkyl such as benzyl, phenethyl and the like, α-methyl-phenethyl, α-methyl-β-hydroxy-phenethyl, diphenylmethyl (or benzhydryl) and the like; saturated heterocyclicamino-lower alkyl wherein the heterocyclicamino moiety comprises a saturated monocyclic 5- to 6-membered ring having at least one nitrogen atom as the heteroatom, e.g., β-pyrrolidinyl-ethyl, γ-piperidinopropyl, piperidyl-methyl, morpholino-ethyl, β-(N'-methyl-piperazino)-ethyl and the like; and aromatic heterocyclicamino-lower alkyl wherein the heterocyclicamino moiety comprises an aromatic monocyclic five- to six-membered ring having at least one nitrogen atom as the heteroatom, e.g., pyridyl-methyl, quinolyl-methyl, pyrrolyl-methyl, β-(3-indolyl)-ethyl, α-(lower alkoxy-carbonyl)-β-(3-indolyl)-ethyl and the like. In addition, $R_2$ may be:

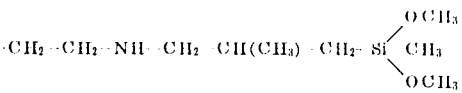

and

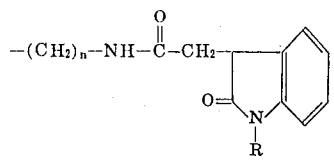

wherein R is as previously described and n is a whole integer from 2 to 6.

In the aforementioned $NR_3R_4$, the symbol $R_3$ is lower alkyl and the symbol $R_4$ may be a substituent defined hereinabove for $R_2$, preferably lower alkyl and dialkylamino-lower alkyl.

The symbol N = B represents a cyclic amino selected from the group consisting of morpholino, N'-(lower alkyl)-piperazino, pyrrolidinyl and piperidino. In addition, said N = B may be:

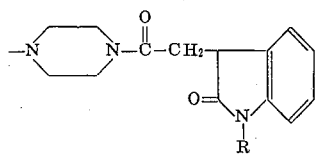

wherein R is as previously described.

As used herein, lower alkyl and lower alkoxy include straight and branched saturated aliphatic chains, such as, for example, methyl, ethyl, propyl, isopropyl, butyl, isobutyl, secondary-butyl, pentyl, hexyl and the like, and, respectively, methoxy, ethoxy, propoxy, isopropoxy, etc.

The subject compounds (I-a) may be advantageously prepared from 2-oxindole-3-acetic acids of formula (II), wherein R is as heretofore described, which may be treated with a lower alkoxy-acetylene (III), e.g., ethoxy-acetylene, to yield the corresponding 1-(lower alkoxy)-vinyl esters (IV) of said 2-oxindole-3-acetic acids. Such esters, which may be denoted as (1-lower alkoxy-vinyl) 2-oxo-3-indoline acetates, are believed to be novel compounds and, as such, constitute an additional feature of this invention. The esterification reaction is preferably conducted at or below 30°C. in an aprotic solvent such as, for example, methylene chloride, chloroform and the like, and, preferably, with an excess of the lower alkoxyacetylene. Although not critical, a catalytic amount of mercuric ion accelerates the rate of reaction. The esters may then be treated with ammonia ($HNH_2$) or an appropriate primary ($HNHR_2$) or secondary ($HNR_3R_4$; HN=B) amine to yield the corresponding acetamides (I-a) of this invention wherein Z is $NH_2$, $NHR_2$, $NR_3R_4$ and N=B, respectively, provided, however, that when Z is $NH_2$, R is other than hydrogen. It is not necessary to isolate the esters prior to the ammonolysis step. The foregoing reactions may be illustrated as follows:

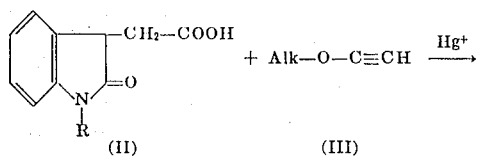

(II)   (III)

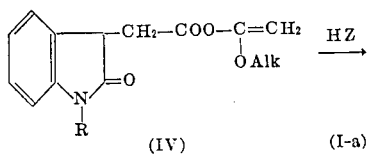

Among the 1-R-2-oxindole-3-acetic acid starting materials (II), the N-unsubstituted compound, i.e., 2-oxindole-3-acetic acid, is known. The preparation of those compounds, wherein R is lower alkyl or aralkyl, is described in my co-pending application Ser. No. 460,576, filed on June 1, 1965.

Another method of preparing the subject compounds (I–a) is by treating the alkali metal, e.g., sodium salt of the acid (II) with oxyalyl chloride, preferably in stoichiometric quantities, the product of which is then treated with excess amine (HZ). Aprotic solvents and temperatures at or below room temperature are preferred. Typical solvents include the aromatic hydrocarbons such as, benzene, toluene, xylene and the like, ethers such as dioxane, tetrahydrofuran and the like, and chlorinated hydrocarbons such as carbon tetrachloride, chloroform and methylene chloride. The starting alkali metal salts are obtained in the conventional manner, for example, by treating the acid (II) with an alkali metal hydroxide.

In addition, the subject compounds (I–a) may be prepared by treating the acid (II) with an appropriate amine (HZ) in the presence of a dehydrating agent such as, for example, dicyclohexylcarbodiimide. Stoichiometric quantities of each are preferred. Typical solvents include methylene chloride, dimethylformamide, dioxane, lower alkanols, tetrahydrofuran and the like. Elevated temperatures may be advantageously employed.

The subject compounds of formula (I–b) may be prepared by treating a suitable 3-alkyl-2-oxindole of formula (V), wherein R and $R_1$ are as previously described, with a compound of formula (VI), wherein halo is preferably chloro or bromo. The reaction is advantageously conducted in a suitable organic solvent, for example, a lower alkanone, and in the presence of a halogen acid acceptor, e.g., sodium or potassium carbonate, to bind the halogen acid that is liberated during the course of the reaction. Among the organic solvents that are operable herein are dimethylformamide; aromatic hydrocarbons such as toluene, benzene, xylene and the like; lower alkanols; and lower alkanones. Among the preferred compounds of formula (I–b) is 3-ethyl-1,N,N-tri-(lower alkyl)-2-oxo-3-indolineacetamide. The reaction scheme may be illustrated as follows:

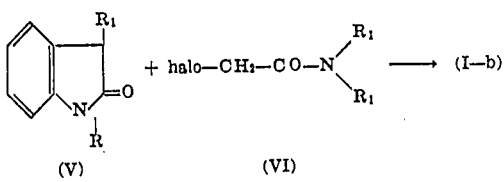

The compounds of formulas (I–a) and (I–b) absorb ultra-violet (U.V.) light which makes them useful as U.V.-screening materials. Because of their general solubility in organic materials, they may be used as U.V.-absorbers in plastics and resins, such as, for example, polystyrene, polyethylene, polypropylene, polyacrylics (e.g., methacrylate resin, polyacrylamides, polyacrylonitrile fibers, etc.), polyamide (e.g., nylon) fibers and polyester fibers. The inclusion of about 0.01–5.0 per cent of the absorber, based on the polymer weight, is usually sufficient to render protection against ultra-violet light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of polymers into fibers, etc.

In addition, these compound have useful pharmacological properties. For example, when Z is a α-methylphenethylamino and R is H, a loss of righting reflex is observed in mice at a dose of 300 mg./kg. of body weight after intraperitoneal (i.p.) administration. Ataxia is generally observed with these compounds when administered i.p. to mice at a dose of 100–300 mg./kg. of body weight. For example, ataxia is observed at a dose of 100 mg./kg. of body weight when in formula (I–a) Z is benzylamino and R is H, Z is diphenylmethylamino and R is methyl, Z is α-methylphenethylamino and R is benzyl, Z is β-[3-(1-methylindolyl)ethylamino] and R is methyl, Z is amino and R is methyl, Z is dimethylaminocarbonylmethylamino and R is methyl, Z is benzylamino and R is methyl, Z is N'-methylpiperazino and R is methyl, or when in formula (I–b), R is methyl and $R_1$ is either ethyl or methyl. Ataxia is also observed at a dose of 300 mg./kg. of body weight when Z in formula (I–a) is 2-hydroxyethylamino and R is H, Z is β-ethoxycarbonylethylamino and R is H, Z is ethoxycarbonylmethylamino and R is methyl, Z is α-methyl-β-hydroxyphenethylamino or Z is α-methoxycarbonyl-β-(3-indolyl)-ethylamino and R is H. Ataxia as well as a loss of righting reflex are used in animal screens as indications of CNS depression.

The following examples are intended to illustrate, but not to limit, the scope of the present invention.

EXAMPLE I

Ethoxyacetylene (37.8 g., 0.54 mole) is added to a stirred suspension of mercuric acetate (1.20 g., 0.0038 mole) in dry methylene chloride (800 ml.). Oxindole-3-acetic acid (51.5 g., 0.27 mole) is then added and the mixture stirred until solution is complete. The solution is filtered and the filtrate evaporated to dryness under reduced pressure at room temperature. The gummy solid is crystallized from benzene-hexane as fine white crystals, (1-ethoxyvinyl) 2-oxo-3-indoline acetate; m.p. 139.5°–140°.

Analysis: Calcd. for $C_{14}H_{15}NO_4$: C, 64.36; H, 5.79; N, 5.36%.

Found: C, 64.06; H, 5.70; N, 5.38%.

EXAMPLE II

To a stirred solution of (1-ethoxyvinyl) 2-oxo-3-indolineacetate (10 g., 0.038 mole) in chloroform (150 ml.) is added a solution of benzylamine (4.1 g., 0.038 mole) in chloroform (25 ml.). The mixture is stirred overnight at room temperature. A white precipitate, m.p. 195°–196°C., is filtered off. The filtrate is evaporated under reduced pressure at room temperature to give a pale yellow gum which crystallizes from chloroform. The combined solids are recrystallized from chloroform to give a white crystalline material, N-benzyl 2loxo-3-indolineacetamide; m.p. 194°–196°C.

Analysis: Calcd. for $C_{17}H_{16}N_2O_2$: C, 72.84; H, 5.75; N, 9.99%.

Found: C, 73.15; H, 5.85; N, 10.35%.

EXAMPLE III

To a stirred solution of (1-ethoxyvinyl) 2-oxo-3-indoline acetate (10 g., 0.038 mole) in chloroform (150 ml.) is added d-amphetamine (5 g., 0.038 mole) in chloroform (30 ml.). The mixture is stirred at room temperature for 18 hrs. The filtered solution is evaporated under reduced pressure at room temperature to give a yellow gum which crystallizes from benzene. Recrystallization from benzene gives an off-white solid, d-N-(α-methylphenethyl) 2-oxo-3-indolineacetamide; m.p. 136.5°–137°C.

Analysis: Calcd. for $C_{19}H_{20}N_2O_2$: C, 74.00; H, 6.54; N, 9.09%.

Found: C, 74.03; H, 6.51; N, 8.81%.

EXAMPLE IV

To a stirred solution of (1-ethoxyvinyl) 2-oxo-3-indoline acetate (12.0 g., 0.046 mole) in chloroform (130 ml.) is added a solution of 2-aminoethanol (2.70 g., 0.046 mole) in chloroform (30 ml.). Stirring is continued for 18 hrs. at room temperature. The white precipitate is filtered off and recrystallized from methanol as white crystals, N-(β-hydroxyethyl) 2-oxo-3-indolineacetamide, m.p. 163°–164°C.

Analysis: Calcd. For $C_{12}H_{14}N_2O_3$: C, 61.52; H, 6.02; N, 11.96%.

Found: C, 61.45; H, 6.06; N, 11.80%.

EXAMPLE V

Glycine ethyl ester (3.9 g., 0.038 mole) in chloroform (30 ml.) is added to a stirred solution of (1-ethoxyvinyl) 2-oxo-3-indoline acetate (10 g., 0.038 mole) in chloroform (150 ml.). The mixture is stirred for 18 hrs. at room temperature. Filtration gives a white solid, m.p. 170°–171°C. The filtrate is evaporated to dryness and the residue crystallized from chloroform. The combined solids are recrystallized from chloroform to give ethyl N-(2-oxoindolin-3-yl)acetyl-glycinate; m.p. 170°–171°C.

Analysis: Calcd, for $C_{14}H_{16}N_2O_4$: C, 60.86; H, 5.84; N, 10.14%.

Found: C, 60.39; H, 5.76; N, 10.34%.

EXAMPLE VI

Nor-ψ-ephedrin (5.7 g., 0.0377 mole) in 50 ml. chloroform is added to (1-ethoxyvinyl) 2-oxo-3-indoline acetate (9.9 g., 0.0377 mole) in 150 ml, chloroform. The mixture is stirred for 18 hrs. at room temperature, filtered and evaporated to dryness. The residue is crystallized from ethyl acetate as off-white crystals, m.p. 184°–188°C. Recrystallization from ethyl acetate gives white crystals, N-(β-hydroxy-α-methylphenethyl) 2-oxo-3-indolineacetamide; m.p. 191°–192°C.

EXAMPLE VII

A. N-Methylpiperazine (4.0 g., 0.04 mole) in 30 ml. chloroform is added to a stirred solution of (1-ethoxyvinyl) 2-oxo-3-indoline acetate (10.4 g., 0.0397 mole) in 150 ml. chloroform. The mixture is stirred for 18 hrs. at room temperature, filtered and the solvent removed under reduced pressure. The residual oil crystallizes from chloroform-ether as an almost colorless material, 1-methyl-4-(2-oxoindolin-3-yl)acetylpiperazine; m.p. 154°–155°C.

B. The procedure of Example VII-A is followed except that an equivalent quantity of piperidine and pyrrolidine, respectively, is used in place of the N-methylpiperazine used therein to yield, as respective products, N-(2-oxoindolin-3-yl)acetylpiperidine and N-(2-oxoindolin-3-yl)acetylpyrrolidine.

EXAMPLE VIII V

Morpholine (4.0 g., 0.045 mole) in 10 ml. chloroform is added to a solution of (1-ethoxyvinyl) 2-oxo-3-indoline acetate (12.0 g., 0.046 mole) in 150 ml. chloroform. The mixture is stirred overnight at room temperature, filtered and the solvent removed in vacuo to give a yellow oil which crystallizes from chloroform-ether as tan colored crystals. Two further recrystallizations from the same solvent mixture give cream-colored crystals, N-(2-oxoindolin-3-yl)acetyl-morpholine; m.p. 156°–158°C.

EXAMPLE IX

Tryptophan methyl ester (7.5 g., 0.034 mole) in 50 ml. chloroform is added to a solution of (1-ethoxyvinyl) 2-oxo-3-indoline acetate (9.5 g., 0.036 mole) in 100 ml. chloroform. The mixture is stirred overnight at room temperature, filtered and solvent removed under reduced pressure to give a brown oil which crystallizes from chloroform, m.p. 110°–114°C. Recrystallization from ethyl acetate, after the removal of insolubles, gives a white crystalline solid, methyl N-(2-oxo-3-indolinyl)-acetyl tryptophanate; m.p. 195°–197°C.

Analysis: Calcd. for $C_{22}H_{21}N_3O_4$: C, 67.50; H, 5.41; N, 10.74%.

Found: C, 67.69; H, 5.38; N, 10.77%.

EXAMPLE X (1-Ethoxyvinyl) 2-oxo-3-indoline acetate (12.7 g., 0.048 mole) in 250 ml. chloroform is stirred overnight with a solution of hydroxylamine (1.5 g., 0.046 mole) in 75 ml. of chloroform. A solid separates and is filtered off. Trituration with cold ethylacetate gives a white solid, N-(2-oxo-3-indolinyl)-acetyl hydroxylamine; m.p. 183°–184.5°C. (decomp.) The infrared spectrum is consistent with the expected product.

EXAMPLE XI

N,N,N'-Trimethylethylenediamine (4.7 g., 0.046 mole) in chloroform (30 ml.) is added to a stirred solution of (1-ethoxyvinyl) 2-oxo-3-indoline acetate (12 g., 0.046 mole) in chloroform (150 ml.). The mixture is stirred overnight at room temperature, filtered and solvent removed under reduced pressure to give an amber oil. The infrared spectrum shows bands at 1,690, 1,630 and 1,600(sh) $cm^{-1}$, which are consistent with the expected products, N-(β-dimethylaminoethyl)-N-methyl 2-oxo-3-indolineacetamide.

EXAMPLE XII n-Amylamine (0.33 g., 0.004 mole) in chloroform (5 ml.) is added to a stirred solution of (1-ethoxyvinyl) 2-oxo-3-indoline acetate (1.0 g., 0.004 mole) in 10 ml. chloroform. The mixture is stirred for 18 hrs. at room temperature. Removal of the solvent gives a viscous oil which crystallizes from chloroform-ether, m.p. 135°–139°C. Recrystallization from benzene-hexane gives white crystals, N-(n-amyl) 2-oxo-3-indolineacetamide; m.p. 151°–154°C.

EXAMPLE XIII

Redistilled diethylamino (0.29 g., 0.004 mole) in chloroform (5 ml.) is added to a stirred solution of (1-ethoxyvinyl) 2-oxo-3-indoline acetate (1.0 g., 0.004 mole) in chloroform (15 ml.). Stirring is continued for 72 hrs. by which time the infrared spectrum indicates that reaction is complete, with the formation of N,N-diethyl 2-oxo-3-indolineacetamide.

EXAMPLE XIV

The ethoxyvinyl ester is prepared from 1-methyl-2-oxo-3-indolineacetic acid (8.5 g., 0.041 mole) and a solution of ethoxyacetylene (4.4 g., 0.062 mole) in 150 ml. methylene chloride containing 0.2 g., mercuric acetate. The viscous oil remaining after removal of the solvent is dissolved in 50 ml. chloroform and treated with 3-aminopropanol (3.1 g., 0.041 mole). The mixture is stirred for 22 hrs., filtered and the solvent removed to give a yellow gum which crystallizes from benzenecyclohexane as yellow crystals, N-(γ-hydroxypropyl)-1-methyl 2-oxo-3-indolineacetamide; m.p. 73°–76°C. Recrystallization from ether raises the m.p. to 76°–78°C.

EXAMPLE XV

A. 1-Methyl 2-oxo-3-indolineacetic acid (8.5 g., 0.042 mole) is added to a solution of ethoxyacetylene (5.25 g., 0.075 mole) and mercuric acetate (0.2 g.) in dry methylene chloride (250 ml.). The mixture is stirred at room temperature until homogeneous, filtered and evaporated under reduced pressure to give the ethoxyvinyl ester as a viscous oil. The oil is dissolved in chloroform (100 ml.) and a solution of N-methylpiperazine (4.2 g., 0.042 mole) in chloroform (20 ml.) is added with stirring. The solution is stirred for 18 hrs. at room temperature, filtered and concentrated in vacuo to give a viscous yellow oil which eventually crystallizes from methylcyclohexane as an off-white solid that slowly turns yellow, 1-methyl-4-(1-methyl-2-oxoindolin-3-yl)acetyl piperazine; m.p. 83°–84.5°C.

Analysis: Calcd. for $C_{16}H_{21}N_3O_2$: C, 66.87; H, 7.37; N, 14.62%.

Found: C, 66.86; H, 7.20; N, 14.37%.

B. The procedure of Example XV-A is followed except that an equivalent quantity of morpholine, piperidine and pyrrolidine, respectively, is used in place of the N-methyl-piperazine used therein, to yield, as respective products, N-(1-methyl-2-oxo-3-indolyl)-acetyl morpholine, N-(1-methyl-2-oxo-3-indolyl)-acetyl piperidine, and N-(1-methyl-2-oxo-3-indolyl)-acetyl pyrrolidine.

EXAMPLE XVI

1-Methyl 2-oxo-3-indolineacetic acid (4.12 g., 0.020 mole) is added to a solution of ethoxyacetylene (2.44 g., 0.035 mole) and 0.1 g. mercuric acetate in methylene chloride (50 ml.). The mixture is stirred until homogeneous, filtered and concentrated in vacuo to give the ethoxyvinyl ester as a viscous oil. N-(Dimethoxymethylsilylisobutyl)-ethylene diamine (4.4 g., 0.02 mole) in 30 ml. chloroform is added to the vinyl ester in 75 ml. chloroform. The mixture is stirred for 20 hrs., filtered and solvent removed under reduced pressure to give a brown oil. The infrared spectrum showed bands at 3,600, 1,690, 1,650 and 1600 $cm^{-1}$, which are consistent with formation of the product, N-[(dimethoxymethylsilylisobutyl)aminoethylene]-1-methyl 2-oxo-3-indolineacetamide.

EXAMPLE XVII

1-Methyl 2-oxo-3-indolineacetic acid (10.25 g., 0.05 mole) is added to a solution of ethoxyacetylene (4.5 g., 0.07 mole) and 0.2 g. mercuric acetate in methylene chloride (150 ml.). The mixture is stirred until homogeneous, filtered and the solvent removed in vacuo to give the vinyl ester as a viscous oil. Liquid methylamine (3.5 ml.) is added to chloroform at −78°C., and this solution is added dropwise to a solution of the vinyl ester in chloroform at −10°C. The mixture is slowly warmed to room temperature and stirred for 18 hrs. The reaction mixture is filtered, and the solvent removed in vacuo to give a viscous amber oil. The infrared bands at 3,800, 3,500, 1,710, 1,680 and 1590 $cm^{-1}$ are consistent with formation of the product, N-Methyl-1-methyl 2-oxo-3-indolineacetamide.

EXAMPLE XVIII

1-Methyl 2-oxo-3-indolineacetic acid (5.12 g., 0.025 mole) is added to a solution of ethoxyacetylene (2.8 g., 0.04 mole) and 0.1 g. mercuric acetate in methylene chloride (100 ml.). The mixture is stirred until homogeneous, filtered and concentrated under reduced pressure. 3-(N-Piperidino)-propylamine (3.46 g., 0.024 mole) in chloroform (25 ml.) is added to a stirred solution of the ethoxyvinyl ester in chloroform (50 ml.). The mixture is stirred for 18 hrs., filtered and the solvent removed under reduced pressure. The infrared spectrum of the residue shows bands at 1,690, 1,650 and 1,600 $cm^{-1}$ which are consistent with formation of the product, N-(γ-piperidinopropyl)-1-methyl 2-oxo-3-indolineacetamide.

EXAMPLE XIX

1-Methyl 2-oxo-3-indolineacetic acid (8.5 g., 0.042 mole) is added to a solution of ethoxyacetylene (4.4 g., 0.063 mole) and mercuric acetate (0.2 g.) in dry methylene chloride (150 ml.). The mixture is stirred at room temperature until homogeneous, filtered and the solvent removed under reduced pressure to give the vinyl ester as a viscous oil. The oil is dissolved in 50 ml. chloroform and benzylamine (4.4 g., 0.042 mole) in 15 ml. chloroform is added. The mixture is stirred at room temperature for 16 hrs. The mixture is filtered and solvent removed to give a yellow oil which crystallizes from chloroform-ether as off-white crystals, N-benzyl- 1-methyl 2-oxo-3-indolineacetamide; m.p. 127°–128°C Anal.: Calcd. for $C_{18}H_{18}N_2O_2$: C, 73.45; H, 6.16; N, 9.52%.
Found: C, 72.64; H, 6.22; N, 9.52%.

EXAMPLE XX

1-Methyl 2-oxo-3-indolineacetic acid (10.3 g., 0.05 mole) is added to a solution of ethoxyacetylene (7.0 g., 0.1 mole) in methylene chloride (200 ml.) containing 0.1 g. mercuric acetate. The mixture is stirred until homogeneous, filtered and evaporated under reduced pressure to give the ethoxyvinyl ester as a viscous oil. The ethoxyvinyl ester is dissolved in chloroform (100 ml.) and treated with α-amino-N,N-dimethyl-acetamide (5.1 g., 0.05 mole) in chloroform (10 ml.). The mixture is stirred at room temperature for 44 hrs., filtered and the solvent removed in vacuo. The residual oil is crystallized from chloroform-ether as off-white crystals; m.p. 142°–145°C. Two recrystallizations from the same solvent mixture give off-white crystals, N,N-dimethyl-(1-methyl-2-oxo-3-indolyl)-acetamidoacetamide; m.p. 145°–146.5°C.

Anal.: Calcd. for $C_{15}H_{19}N_3O_3$: N, 14.52%.
Found: N, 14.47%.

EXAMPLE XXI

An ammoniacal chloroform solution (45ml.) is added to a cooled, stirred solution of the ethoxyvinyl ester, obtained from 1-methyl 2-oxo-3-indolineacetic acid (10.3 g., 0.05 mole) and ethoxyacetylene (5.3 g., 0.075 mole) in the presence of mercuric acetate (0.1 g.) in chloroform (50 ml.). The mixture is stirred overnight at room temperature. The mixture is evaporated to dryness and the residual yellow viscous oil is crystallized from ethyl acetate as tan colored crystals; m.p. 169°–171°C. Two further recrystallizations from the same solvent affords off-white crystals, 1-methyl 2-oxo-3-indolineacetamide; m.p. 171.5°–172°C.

Anal.: Calcd. for $C_{11}H_{12}N_2O_2$: C, 64.69; H, 5.92; N, 13.72%.
Found: C, 64.76; H, 6.08; N, 13.58%.

EXAMPLE XXII

1-Methyl 2-oxo-3-indolineacetic acid (8.5 g., 0.041 mole) is added to a solution of ethoxyacetylene (4.2 g., 0.06 mole) and mercuric acetate (0.20 g.) in dry methylene chloride (150 ml.). The mixture is stirred at room temperature until homogeneous, filtered and evaporated under reduced pressure to give the vinylester as a viscous oil. A solution of benzhydrylamine (7.65 g., 0.046 mole) in chloroform (35 ml.) is added to a solution of the vinyl ester in 100 ml. chloroform. The mixture is stirred overnight at room temperature, filtered and evaporated to dryness under reduced pressure. Recrystallization of the semisolid residue from chloroform-ether gives off-white crystals, N-(diphenylmethyl)-1-methyl 2-oxo-3-indolineacetamide; m.p. 162°–166°C. One further recrystallization from ethyl acetate raises the melting point to 173°–175°C.

Analysis: Calcd. for $C_{24}H_{22}N_2O_2$: C, 77.81; H, 5.99; N, 7.56%.
Found: C, 77.57; H, 5.99; N, 7.47%.

EXAMPLE XXIII

1-Methyl 2-oxo-3-indolineacetic acid (10 g., 0.049 mole) is added to a solution of ethoxyacetylene (5.1 g., 0.073 mole) and mercuric acetate (0.25 g.) in dry methylene chloride (100 ml.). The mixture is stirred at room temperature until homogeneous, filtered and evaporated under reduced pressure to give the vinyl ester as a viscous oil. A solution of glycine ethyl ester (5.0 g., 0.049 mole) in chloroform (40 ml.) is added to the vinyl ester in chloroform (60 ml.). The mixture is stirred at room temperature for 20 hrs., filtered and evaporated to dryness under reduced pressure. The resulting oil crystallizes from chloroform-ether to give ethyl N-(1-methyl-2-oxo-indolyl-3-yl)-acetylglycinate, m.p. 103.5°–105.5°C.

Analysis: Calcd. for $C_{15}H_{18}N_2O_4$: C, 62.05; H, 6.25; N, 9.65%.
Found: C, 62.05; H, 6.25; N, 9.91%.

EXAMPLE XXIV

A. 1-Methyl-2-oxo-3-indolineacetic acid (10.25 g., 0.05 mole) is added to a solution of ethoxyacetylene (5.25 g., 0.075 mole) in methylene chloride (200 ml.) containing 0.25 g. mercuric acetate. The mixture is stirred at room temperature until homogeneous, filtered and evaporated under reduced pressure to give the vinyl ester as a viscous oil. Ethylenediamine (1.5 g., 0.025 mole) in chloroform (10 ml.) is added to a chloroform (50 ml.) solution of the vinyl ester. The mixture is stirred for 24 hrs., filtered and evaporated to dryness. Crystallization of the residual yellow gum from chloroform-hexane gives an off-white solid, 1,1'-dimethyl-2,2'-dioxo-N,N'-ethylene-bis-(3-indolineacetamide); m.p. 204°–207°C. Recrystallization from the same solvent mixture raises the melting point to 207°–209°C.

Anal. Calcd. for $C_{24}H_{26}N_4O_4$: C, 66.34; H, 6.03; N, 12.90%.
Found: C, 65.33; H, 6.17; N, 13.01%.

B. By repeating the procedure of Example XXIV-A, except that 2-oxo-3-indolineacetic acid is reacted with tetramethylenediamine and hexamethylenediamine, respectively, in equivalent quantities, the following products are obtained: 2,2'-dioxo-N,N'-tetramethylene-bis-(3-indolineacetamide) and 2,2'-dioxo-N,N'-hexamethylene-bis-(3-indolineacetamide).

EXAMPLE XXV

1-Methyl 2-oxo-3-indolineacetic acid (10.25 g., 0.05 mole) is added to a solution of ethoxyacetylene (5.0 g., 0.07 mole) in methylene chloride (200 ml.) containing 0.25 g. mercuric acetate. The mixture is stirred at room temperature until homogeneous, filtered and evaporated under reduced pressure to give the vinyl ester as a viscous oil. Piperazine (2.0 g., 0.023 mole) in chloroform (10 ml.) is added to a solution of the vinyl ester in 100 ml. chloroform. The mixture is stirred for 27 hrs., filtered and evaporated to dryness. The residual yellow oil is dissolved in chloroform, and ether is added to give an off-white solid, 1,4-di-(1-methyl-2-oxoindolin-3-yl)acetylpiperazine; m.p. 210°–213°C. Recrystallization from the same solvent mixture raises the m.p. to 213°–215°C.

EXAMPLE XXVI

A. 3-Ethyl-1-methyloxindole (8.75 g., 0.05 mole) and N,N-dimethylchloroacetamide (8.1 g., 0.067 mole) are added separately to a stirred suspension of anhydrous potassium carbonate (13.8 g., 0.1 mole) in dry acetone (200 ml.). The mixture is stirred at room temperature for 48 hrs., filtered and the solvent removed to get a viscous yellow oil. The oil is crystallized from chloroform-petroleum ether as a flocculent white solid, m.p. 109°–110°C. Recrystallization from ether gives fine white crystals, 3-ethyl-1,N,N-trimethyl 2-oxo-3-indolineacetamide; m.p. 111.5°–113°C.

Analysis: Calcd. for $C_{15}H_{20}N_2O_2$: C, 69.20; H, 7.74; N, 10.76%.

Found: C, 69.53; H, 7.82; N, 10.57%.

B. The procedure of Example XXVI–A is followed except that an equivalent quantity of N,N-diethylchloroacetamide and N,N-di-(n-propyl)-chloroacetamide is used in place of the N,N-dimethylchloroacetamide therein to yield, as respective products, the N,N-diethyl and N,N-di-(n-propyl) derivatives of 1-methyl-3-ethyl-2-oxo-3-indolineacetamide.

EXAMPLE XXVII

1-Benzyl 2-oxo-3-indolineacetic acid (2.4 g., 0.008 mole) is added to a solution of ethoxyacetylene (1.0 g., 0.014 mole) and mercuric acetate (0.05 g.) in dry methylene chloride (50 ml.). The mixture is stirred until homogeneous, filtered and the solvent removed under reduced pressure to yield a yellow oil. A solution of d-amphetamine (1.1 g., 0.008 mole) in chloroform (10 ml.) is added to a solution of the ethoxyvinyl ester in the same solvent (50 ml.). The mixture is stirred for 16 hrs. at room temperature, filtered and the solvent removed. The resulting yellow glass is crystallized from chloroform-ether as an off-white solid, d-1-benzyl-N-(α-methylphenethyl) 2-oxo-3-indolineacetamide. Recrystallization from the same solvent mixture gives a constant m.p. of 136°–138°C.

Analysis: Calcd. for $C_{26}H_{26}N_2O_2$: N, 7.03%.
Found: N, 7.00%.

EXAMPLE XXVIII

2-Oxo-3-indolineacetic acid (1.57 g., 0.0082 mole) is suspended in 40 ml. methylene chloride and morpholine (1.32 g., 0.0151 mole) is added. Dicyclohexylcarbodiimide (1.7 g., 0.0082 mole) is added immediately and the mixture stirred for 4 hrs. at room temperature. The resulting precipitate is removed by filtration and the mother liquor is washed with 1N hydrochloric acid and 1N sodium bicarbonate solution, then dried and the solvent removed in vacuo. Trituration of the residue with chloroform-petroleum ether gives N-[(2-oxoindolin-3-yl)acetyl]-morpholine; m.p. 158°–161°C.

EXAMPLE XXIX

A suspension of 1-methyl-2-oxo-3-indolineacetic acid (0.95 g., 0.0046 mole) in 10 ml. water is neutralized by slow titration with 0.25 N sodium hydroxide (using phenolphthalein as indicator). The mixture is lyophilized. The dry sodium salt is suspended in anhydrous benzene and oxalyl chloride (0.6 g., 0.0047 mole) is added slowly to the stirred, cooled suspension. The mixture is stirred for 3 hrs. and N-methyl-piperazine (1.0 g., 0.01 mole) is added and stirring continued for 18 hrs. at room temperature. The fixture is filtered and the filtrate evaporated to give a viscous yellow oil. Crystallization from methyl-cyclohexane gives 1-methyl-4-[(1-methyl-2-oxoindolin-3-yl) acetyl]-piperazine as off-white crystals; m.p. 83°–84.5°C.

EXAMPLE XXX

The procedure of Example XVIII is followed to prepare those compounds of formula (I–a) wherein the symbol Z is a saturated heterocyclicamino-(lower alkyl)amino function as heretofore described. For example, by repeating the procedure of Example XVIII except that an equivalent quantity of each of the following heterocyclicamino-(lower alkyl)amines:

piperidyl-methylamine,
2-pyrrolidinyl-ethylamine,
2-morpholino-ethylamine, and
2-(N′-methyl-piperazino)-ethylamine, is used in place of the 3-(N-piperidino)-propylamine used therein, there are obtained, as respective products, the corresponding N-(heterocyclicamino-lower alkyl)-1-methyl 2-oxo-3indolineacetamides.

What is claimed is:

1. A lower alkoxy-vinyl ester of 2-oxindole-3-acetic acid having the formula:

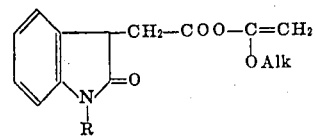

wherein R is a member selected from the group consisting of hydrogen, lower alkyl and benzyl, and alk is lower alkyl.

2. (1-Ethoxyvinyl) 2-oxo-3indoline acetate.

* * * * *

PO-1050
(5/69)

UNITED STATES PATENT OFFICE
CERTIFICATE OF CORRECTION

Patent No. 3,723,458          Dated March 27, 1973

Inventor(s) Janis Plostnieks

It is certified that error appears in the above-identified patent and that said Letters Patent are hereby corrected as shown below:

In Column 5, line 2, "benzyl 2loxo-3-indolineacetamide" should read --- 2-oxo-3-indolineacetamide ---.

In Column 9, line 44, "N,13.58%" should read --- N, 13.48% ---.

Signed and sealed this 13th day of November 1973.

(SEAL)
Attest:

EDWARD M. FLETCHER, JR.
Attesting Officer

RENE D. TEGTMEYER
Acting Commissioner of Patents